(12) United States Patent
Muramiya

(10) Patent No.: US 6,605,785 B1
(45) Date of Patent: Aug. 12, 2003

(54) COMBINATORIAL WEIGHING AND COUNTING DEVICE WITH MULTI-PART COLLECTING CHUTE

(75) Inventor: Masahiko Muramiya, Shiga (JP)

(73) Assignee: Ishida Co., Ltd., Kyoto (JP)

(*) Notice: Subject to any disclaimer, the term of this patent is extended or adjusted under 35 U.S.C. 154(b) by 0 days.

(21) Appl. No.: 09/913,480

(22) PCT Filed: Dec. 24, 1999

(86) PCT No.: PCT/JP99/07311

§ 371 (c)(1),
(2), (4) Date: Aug. 15, 2001

(87) PCT Pub. No.: WO01/48448

PCT Pub. Date: Jul. 5, 2001

(51) Int. Cl.$^7$ .................. G01G 19/387; B65G 11/00
(52) U.S. Cl. .................. 177/25.18; 193/2 R
(58) Field of Search .................. 177/25.18; 193/2 R

(56) References Cited

U.S. PATENT DOCUMENTS

| | | | |
|---|---|---|---|
| 4,497,385 A | | 2/1985 | Sashiki .................. 177/59 |
| 4,602,709 A | * | 7/1986 | Ueda .................. 177/25.18 |
| 4,693,355 A | * | 9/1987 | Bochi et al. .................. 177/25.18 |
| 4,889,241 A | * | 12/1989 | Cogan et al. .................. 193/2 R |
| 5,736,683 A | * | 4/1998 | Howard .................. 177/25.18 |
| 5,753,867 A | * | 5/1998 | Konishi et al. .................. 177/25.18 |
| 5,765,655 A | * | 6/1998 | Tatsuoka .................. 177/25.18 |
| 5,959,258 A | * | 9/1999 | Howard .................. 177/25.18 |
| 6,305,551 B1 | * | 10/2001 | Ruymen .................. 193/7 |

FOREIGN PATENT DOCUMENTS

| | | |
|---|---|---|
| EP | 0723140 A1 | 7/1996 |
| JP | 08-193871 | 7/1996 |

* cited by examiner

Primary Examiner—Randy Gibson
(74) Attorney, Agent, or Firm—Staas & Halsey LLP

(57) ABSTRACT

A combination weighing and counting apparatus supplies articles for each combination weighing cycle, onto a collecting chute, quickly and in a cluster form, towards a discharge mouth without giving rise to a difference in speed, and discharges the articles through the discharge mouth, all at once, to thereby achieve a high speed weighing and counting operation. This apparatus includes the collecting chute for collecting the articles, supplied from plural hoppers, and discharging them through the discharge mouth therebelow. A chute portion of the apparatus has a shape and an angle of inclination causing the articles to move along a parabolic line and be discharged in a cluster form from the discharge mouth.

11 Claims, 3 Drawing Sheets

COMBINATORIAL WEIGHING AND COUNTING DEVICE WITH MULTI-PART COLLECTING CHUTE

BACKGROUND OF THE INVENTION

1. Field of the Invention

The present invention relates to a combination weighing and counting apparatus for selecting a combination of articles that falls within a tolerance range, by combining weights or numbers of the articles such as, for example, potato chips or candies.

2. Background Art

Conventionally, this type of combination weighing and counting apparatus is equipped with a plurality of hoppers for weighing of articles and a funnel-shaped collecting chute having a slide surface inclined towards a discharge mouth at a lower end. The articles are, after having been supplied into each of the hoppers, weighed individually and the resultant weight values are subjected to a combination calculation so that a batch of the articles which have been weighed at a time, resulting in a combination of the weights or numbers falling within a tolerance range, are discharged from the associated hoppers into the collecting chute. The articles so discharged into the collecting chute are, after having slid along the slide surface of the collecting chute towards the discharge mouth, subsequently discharged from the discharge mouth and are then packaged in a bag by a packaging machine positioned therebelow (Japanese Laid-open Patent Publication No. 8-193871).

In the meantime, for the purpose of reducing the cost, a process of packaging the articles is desired to be speeded up. However, with the above described apparatus, since the articles from the hoppers are supplied towards the discharge mouth at the lower end while sliding downwardly along the sliding surface of the collecting chute, the speeds at which the articles slide are apt to vary from one article to another because of a frictional resistance with the sliding surface. As a result thereof, the articles for one combination weighing cycle are supplied in the form as lined up towards the discharge mouth, a relatively large length of time is required up until all of the articles for one combination weighing cycle complete their travel past the discharge mouth. Thus, if a relatively large length of time is required up until the articles for one combination weighing cycle travel past the discharge mouth, the timing at which the hoppers are opened for the subsequent combination weighing cycle and the timing at which the bag is sealed by the packaging machine tend to be delayed. This frustrates speeding up of the weighing and counting operation and the packaging operation.

The present invention has for an object to provide a combination weighing and counting apparatus capable of supplying the articles for each combination weighing cycle, which has been supplied onto the collecting chute, quickly in a cluster form towards the discharge mouth without giving rise to a difference in speed, and discharging the articles in a cluster form through the discharge mouth all at once to thereby achieve a high speed weighing and counting operation.

SUMMARY OF THE INVENTION

In order to accomplish the foregoing object, the present invention is directed to a combination weighing and counting apparatus which comprises a plurality of hoppers and is operable to select a combination of articles supplied into the hoppers by combining respective weights or numbers of the articles within the corresponding hoppers so that the combination of the weights or numbers may fall within a tolerance range, wherein an upper stage chute portion of a collecting chute for collecting the articles supplied from the hoppers and discharging them from a discharge mouth at a lower end thereof has a shape and an angle of inclination, both of which are so designed that the articles supplied from the hoppers can be discharged in a cluster form and reach the discharge mouth while the discharged articles depict a parabolic line.

According to the foregoing structure, the articles for each combination weighing cycle are supplied into the upper stage chute portion of the collecting chute and then fall naturally in the cluster form towards the discharge mouth of the collecting chute while depicting the parabolic line. Because of this, the individual articles emerging outwardly from the upper stage chute portion of the collecting chute can be quickly collected in the cluster form at the discharge mouth without substantially contacting other portions of the collecting chute, that is, without being affected so much by the frictional resistance brought about by the collecting chute. Accordingly, the timing at which the hoppers are opened for the subsequent weighing cycle can be accelerated to thereby achieve a high speed weighing and counting operation.

Also, in the present invention, a partitioning member is preferably provided in a portion of the upper stage chute portion below the hoppers for preventing the articles, supplied from the hoppers, from dispersing in a direction circumferentially of the collecting chute. By so doing, even the articles such as, for example, candies, of a kind apt to jump laterally at the time they are supplied into the upper stage chute can advantageously be prevented by the partitioning members from dispersing in the direction circumferentially of the upper stage chute portion. Accordingly, the articles can arrive at the discharge mouth having traveled the shortest distance and, consequently, the articles will not line up upwardly and downwardly and are rather quickly collected in the cluster form, to thereby enable a further high speed counting and weighing operation.

Furthermore, in the present invention, the collecting chute preferably includes the upper stage chute portion and a lower stage chute portion positioned below the upper stage chute portion and of the chute portions the lower stage chute portion preferably has a plurality of inner wall surfaces arranged up and down, each of the inner wall surfaces being rectilinearly inclined at a different angle of inclination, in which case each of the inner wall surfaces has upper and lower ends in a longitudinal section positioned on the parabolic line, which defines a path for natural fall of the articles, or at respective location radially outwardly thereof. By so doing, at least the lower stage chute portion can be easily obtained by bending a plate member since the inner wall surface thereof is formed as a rectilinearly inclined surface, thereby reducing the cost of manufacture.

In one preferred embodiment of the present invention, a radially outer wall of each of the hoppers is inclined at a small angle of inclination relative to an inner bottom surface of the upper stage chute portion, and a gate for controlling supply of the articles within the respective hopper is pivotally fitted to and about a horizontally extending support shaft positioned radially inwardly of the respective hopper.

Thus, if the radially outer wall of each of the hoppers is inclined at a small angle of inclination relative to an inner bottom surface of the upper stage chute portion, the angle of collision of the articles with the upper stage chute portion can be reduced to minimize the force of collision and, therefore, the fragile articles such as, for example, potato chips can be smoothly supplied from the hoppers onto the upper stage chute portion without being damaged. Also, since the gate is pivotable about the horizontally extending support shaft positioned radially inwardly of the respective hopper, even though the outer wall of each hopper is inclined as described above, the gate can be opened large while both are positioned close to each other with no need to use a relatively large space between the respective hopper and the upper stage chute portion.

Accordingly, positioning of the hoppers and the upper stage chute portion in respective locations close to each other, the distance for the article to travel between them can be minimized to thereby minimize the speed at which the article may collide against the upper stage chute portion. For this reason, the articles from the hoppers can, while the damage thereto is suppressed, be supplied onto the upper stage chute portion, prevented from dispersing in the circumferential direction which would otherwise take place when the articles collide against the upper stage chute, and finally be supplied quickly in the cluster form towards the discharge mouth. In addition, since the articles can be guided by the hoppers shortly before being supplied into the upper stage chute portion, fall of the articles can be controlled in a desired direction.

If, while both are positioned close to each other, the gate is supported by a support axle positioned radially outwardly of the associated hopper, a tip thereof will contact the inner bottom surface of the upper stage chute portion when the gate is opened and, accordingly, the gate is unable to be opened large. In contrast thereto, when the gate is supported by the support shaft positioned radially inwardly of the respective hopper, the gate can be opened in a direction counter to the inner bottom surface of the upper stage chute portion and, accordingly, even though both are positioned close to each other, the gate can be opened large, whereby the articles from the hoppers can be supplied into the upper stage chute portion in the cluster form.

In another preferred embodiment of the present invention, each of the hoppers is provided with a gate for controlling supply of the articles within the respective hopper, and a first partitioning portion for preventing the articles from dispersing in the circumferential direction when the gate is opened is provided below a closed position of the gate so as to extend from opposite side walls of the respective hopper. In a further preferred embodiment of the present invention, the gate is provided with a second partitioning portion for preventing the articles from dispersing in the circumferential direction.

By so doing, when the articles within the hoppers are to be supplied onto the upper stage chute portion by opening the associated gates, dispersion of the articles in the circumferential direction can be suppressed by the first or second partitioning portion. Accordingly, the individual articles can be quickly supplied onto the upper stage chute portion in the cluster form.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE EMBODIMENTS

Hereinafter, the present invention will be described in detail with reference to the accompanying drawings.

Figure 1:
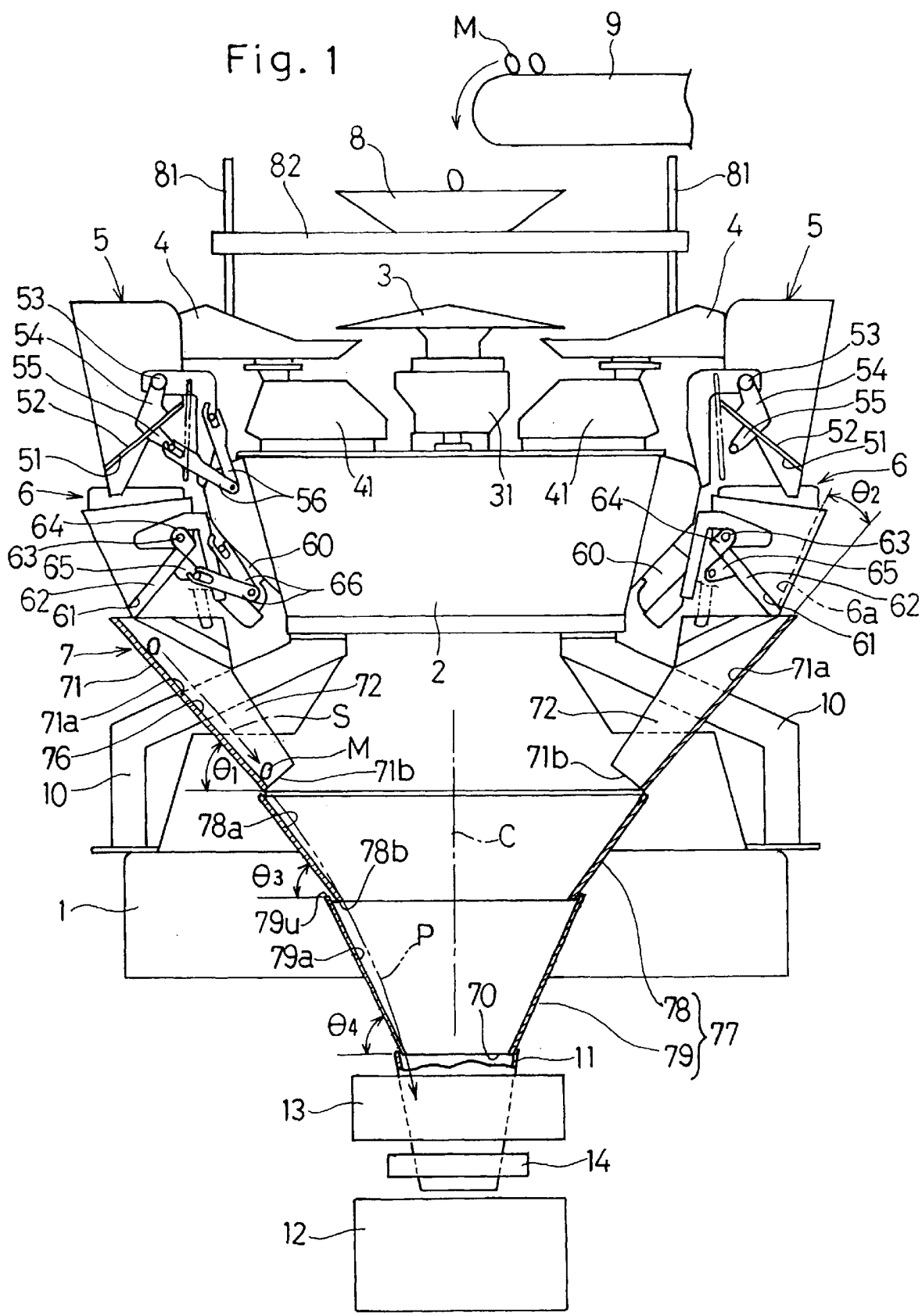
FIG. 1 is a schematic front elevational view, with a portion cut away, of a combination weighing and counting apparatus according to a first preferred embodiment of the present invention.

A combination weighing and counting apparatus shown in FIG. 1 includes a support casing 2 mounted on a base structure 1 that is mounted on a plant floor surface, by means of a plurality of support legs 10, and a vibratory dispensing feeder 3 of a generally flattened conical shape equipped with a vibrating mechanism 31 and mounted atop a center portion of the support casing 2. Positioned immediately below an outer periphery of the dispensing feeder 3 are a plurality of vibratory feeders 4 each equipped with a corresponding vibrating mechanism 41 arranged in a radial pattern.

A plurality of pool hoppers 5 is positioned generally below the respective vibratory feeders 4 in communication with radial outer ends of those vibratory feeders 4 and are arranged in a circumferentially extending circular row in the same horizontal plane in operative association with the feeders 4.

Each of the pool hoppers 5 has a discharge mouth 51 defined at a bottom end thereof for discharge therethrough of articles M accommodated within the respective pool hopper 5, and the discharge mouth 51 in each of the pool hoppers 5 is so designed and so configured as to have radially inward and outward lips opposite to each other and positioned at high and lower levels, respectively, in a heightwise direction and, hence, as to have a mouth plane inclined downwardly in a radial outward direction. A first gate 52 for selectively opening and closing the discharge mouth 51 in each of the pool hoppers 5 to thereby control the discharge of the articles M therefrom is fitted to the respective discharge mouth 51 so as to incline downwardly in the radially outward direction. Specifically, the first gate 52 for each pool hopper 5 is pivotally supported through a support member 54 by a horizontal support shaft 53 positioned radially inwardly of the associated pool hopper 5 and is provided with an operating projection 55 that is drivingly coupled with a pair of operating arms 56, so that when the operating projection 55 of each first gate 52 is pivoted through the operating arms 56, the respective first gate 52 can be moved between a closed position, shown by the solid line in this figure, and an opened position as shown by the phantom line at which the first gate 52 assumes a vertically upright posture.

Also, a plurality of weighing hoppers 6 each provided with a weighing unit 60 having a load cell is positioned below the associated pool hoppers 5 and arranged at an outer periphery of the support casing 2 in a circumferentially extending circular row in the same horizontal plane and in operative association with the pool hoppers 5.

As is the case with each of the pool hoppers 5, each of the weighing hoppers 6 has a discharge mouth 61 defined at a bottom end thereof for discharge therethrough of articles M accommodated within the respective weighing hopper 6, and the discharge mouth 61 in each of the weighing hopper 6 is so designed and so configured as to have radially inward and outward lips opposite to each other and positioned at high and lower levels, respectively, in a heightwise direction and, hence, as to have a mouth plane inclined downwardly in a radial outward direction. A second gate 62 for selectively opening and closing the discharge mouth 61 in each of the weighing hopper 6 to thereby control the discharge of the articles M therefrom is fitted to the respective discharge mouth 61 so as to incline downwardly in the radially outward direction. Specifically, the second gate 62 for each weighing hopper 6 is pivotally supported through a support member 64 by a horizontal support shaft 63 positioned radially inwardly of the associated weighing hopper 6 and is provided with an operating projection 65 that is drivingly coupled with a pair of operating arms 66, so that when the operating projection 65 of each second gate 62 is pivoted through the operating arms 66, the respective second gate 62 can be moved between a closed position, shown by the solid line in the figure, and an opened position as shown by the phantom line at which the second gate 62 assumes a vertically upright posture. It is to be noted that drive devices for driving the first and second gates 52 and 62 are accommodated within the interior of the support casing 2.

Positioned below the weighing hoppers 6 is a funnel-shaped collecting chute 7 for collecting articles M discharged or supplied from the weighing hoppers 6 and then through a discharge mouth 70 that is defined at a bottom end thereof. The collecting chute 7 is made up of an upper stage chute portion 71 of an inverted truncated conical shape positioned immediately below the weighing hoppers 6, and a lower stage chute portion 77 of the same shape positioned below the upper stage chute portion 71 and having a size smaller than that of the upper stage chute portion 71.

The upper stage chute portion 71 is so configured and so inclined at a predetermined angle as to receive the articles M discharged from the weighing hoppers 6 and then to allow the articles M to slide downwards as shown by the arrow S along an inner bottom surface 71a thereof so that the articles M discharged from a discharge end 71b of the upper stage chute portion 71 can be marshaled into a cluster of articles which subsequently reach the discharge mouth 70 at the bottom end thereof after having naturally fallen downwardly while depicting a parabolic line P. At this time, if the inner bottom surface 71a is defined by a linearly inclined surface and the angle of inclination θ1 thereof relative to the horizontal plane is set to, for example, 48 to 53°, the articles M supplied from the weighing hoppers 6 onto the upper stage chute portion 71 for one cycle of combination weighing can reach the discharge mouth 70 from the discharge end 71b at the bottom of the upper stage chute portion 71 in the form of a cluster of articles of a short length in a vertical direction.

An outer wall 6a of each of the weighing hoppers 6 that is positioned radially outwardly thereof is inclined at an angle of inclination θ2 relative to the inner bottom surface 71a of the chute portion 71 which is as small as possible so that the articles M can be smoothly supplied onto the upper stage chute portion 71.

Figure 2A:
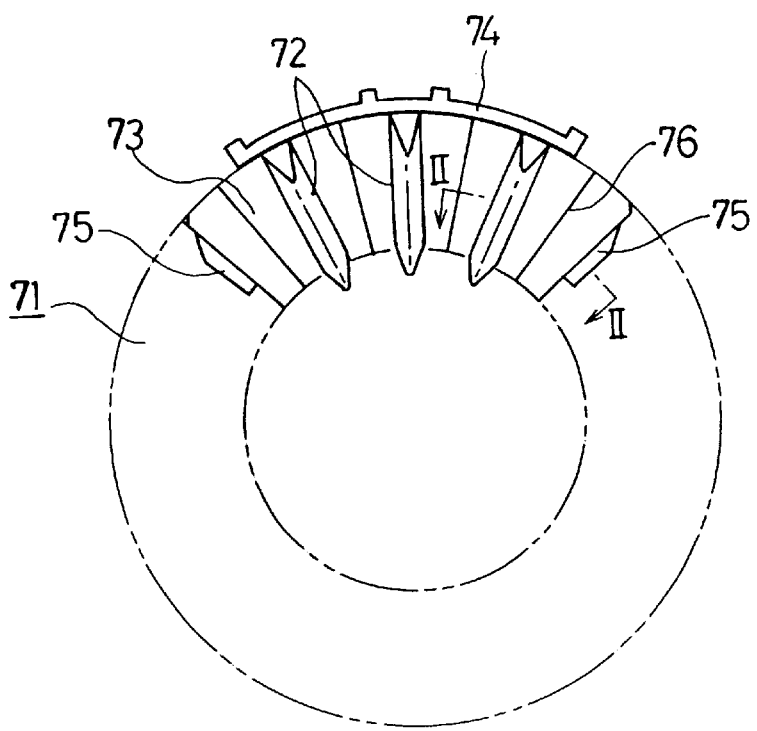
FIG. 2A is a plan view of an upper stage chute portion of a collecting chute used in the combination weighing and counting apparatus of FIG. 1.
Figure 2B:
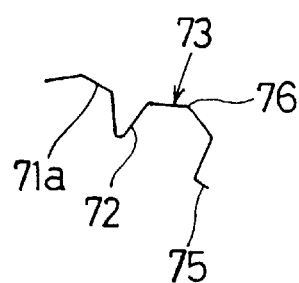
FIG. 2B is a cross sectional view taken along the line II—II in FIG. 2A.

At a location below the weighing hoppers 6 within the upper stage chute portion 71, a plurality of partitioning members 72 is provided for preventing the articles M discharged from the weighing hoppers 6 from being dispersed in a circumferential direction. The upper stage chute portion 71 is, as shown in FIG. 2A, formed of a plurality of divided bodies 73 that are divided in a circumferential direction so as to render its entirety to represent a shape similar to an inverted truncated cone with the divided bodies 73 arranged circumferentially. Each of the divided bodies 73 is made from a sector-shaped plate member and, as shown in FIG. 2B, the respective plate member is formed integrally with a plurality of wrinkled projections by bending it, with the projections being defined as a partitioning member 72. An inner bottom surface 71a of each of the divided bodies 73 is also bent along a radially extending bending line 76 to allow the line 76 to protrude radially outwardly so that the articles M can be guided straight downwardly along a radial direction. In this figure, reference numeral 74 represents a support member supporting a plurality of divided bodies 73 at respective outer surfaces and flanges 75 thereof, and this support member 74 is supported by the support legs 10 by means of a mounting frame (not shown).

It is to be noted that the partitioning member 72 may be a separate member which is in turn mounted on the upper stage chute portion 71.

As shown in FIG. 1, the lower stage chute portion 77 is divided into upper and lower segments, and each of first and second divided segments 78 and 79 thereof is formed from a plate member of an inverted truncated conical shape. Accordingly, the first and second divided segments 78 and 79 have their first and second inner wall surfaces 78a and 79a that are inclined rectilinearly in a vertical section containing a center axis C of the collecting chute 7. In addition, respective angles of inclination θ3 and θ4 of the inner wall surfaces 78a and 79a differ from each other and the latter θ4 is chosen to be greater than the former θ3. Thus, the inner wall surfaces 78a and 79a are so arranged as to follow a parabolic line P extending slantwise downwardly from the inner bottom surface 71a of the upper stage chute portion 71. In other words, with respect to the parabolic line P, respective lower ends of the inner wall surfaces 78a and 79a are positioned on the parabolic line P while respective upper ends thereof are positioned at respective locations adjacent and radially outward of the parabolic line P. The first divided segment 78 has a lower end portion 78b that is somewhat overlapped vertically with and positioned inwardly of an upper end portion 79u of the second divided segment 79. By so doing, the lower stage chute portion 77 can be easily defined by the plurality of the simple conical divided segments 78 and 79.

By way of example, where the angle of inclination θ1 of the inner bottom surface 71a of the upper stage chute portion 71 relative to the horizontal plane is to be set at about 48°, the angle of inclination θ3 of the inner wall surface 78a of the first divided segment 78 relative to the horizontal plane is to be set at about 54° and the angle of inclination θ4 of the inner wall surface 79a of the second divided segment 79 relative to the horizontal plate is to be set at about 66°. By so setting the angles of inclination, the articles M emerging outwardly from the discharge end 71b of the upper stage chute portion 71 naturally fall downwardly towards the discharge mouth 70 at the lower end of the lower stage chute portion 77 while depicting the parabolic line P, without substantially contacting the inner wall surfaces 78a and 79a of the divided segments 78 and 79, that is, without receiving a frictional resistance with the divided segments 78 and 79. The upper stage chute portion 71 and the divided segments 78 and 79 of the lower stage chute portion 77 are supported by the machine frame 1 through support members (not shown).

It is to be noted that as is the case with the lower stage chute portion 77 the upper stage chute portion 71 may be made up of a plurality of vertically divided segments.

In the embodiment shown in FIG. 1, a supply chute 8 is provided above the dispensing feeder 3 by means of a plurality of columns 81 and a support frame 82, and a transport conveyor 9 is arranged thereabove for supplying the articles M onto the supply chute 8. Also, a discharge chute 11 is provided below the lower stage chute portion 77, and a packaging machine 12 is arranged therebelow. In this figure, reference numeral 13 represents a metal detector disposed at a location generally intermediate of the discharge chute 11 for detecting metallic particles mixed in the articles M. Reference numeral 14 represents a support frame for the discharge chute 11.

In the following description, the operation of the combination weighing and counting apparatus of the structure described above will be discussed.

At the outset, the articles M transported by the transport conveyor 9 and subsequently supplied through the supply chute 8 are supplied onto the vibrating feeders 4 while having been dispensed in the circumferential direction by the dispensing feeder 3 then vibrated, and the articles within the vibrating feeders 4 are then supplied into the respective pool hoppers 5 where they are temporarily stored. Thereafter, the articles are, when the first gates 52 are driven to open, discharged from the discharge mouths 51 of the respective pool hoppers 5 and are supplied into the weighing hoppers 6. The weighing units 60 including the respective load cells and coupled with the associated weighing hoppers 6 weigh the articles M supplied thereto. Weights measured by these weighing units 60 are supplied to the control device including a microcomputer (not shown), and a combination of the weighing hoppers 6 which result in the total weight (combined weight) or total number (combined number) of the articles M failing within the tolerance range is selected. This tolerance range is so fixed as to have its lower limit equal to a target value and an upper limit which is somewhat greater than the target value.

Once the combination of the weighing hoppers 6 is selected, the second gates 62 provided in the respective weighing hoppers 6 are opened in response to a control signal from the control device and the articles M for one cycle of combination weighing are supplied or discharged into the upper stage chute portion 71 of the collecting chute 7, slide along the inner bottom surface 71a thereof in the direction shown by the arrow S and, finally, fall naturally from the discharge end 71b along the parabolic line P to thereby reach the discharge mouth 70. At this time, since the inner wall surfaces 78a and 79a of the respective divided segments 78 and 79 of the lower stage chute portion 77 represent a shape substantially following the bent line on the parabolic line P, the articles discharged from the discharge end 71b of the upper stage chute portion 71 reaches the discharge mouth 70 while having depicted the parabolic line P, without substantially contacting the divided segments 78 and 79. Accordingly, any possible occurrence of the difference in sliding speed and time (the time required to discharge) of the individual articles M which would be brought about by the frictional resistance with the lower stage chute portion 77 can be suppressed advantageously and, therefore, the articles M can be collected in a cluster form at the discharge mouth 70 there below.

Also, since the upper stage chute portion 71 is made up of the plurality of the partitioning members 72, the articles M supplied from the weighing hoppers 6 and tending to fall downwards while being scattered in a circumferential direction above the upper stage chute portion 71 are prevented by the partitioning members 72 from being scattered circumferentially. Accordingly, even the articles M such as, for example, candies, of a kind apt to jump laterally outwardly at the time they are supplied into the upper stage chute 71 can advantageously be prevented by the partitioning members 72 from jumping within the upper stage chute portion 71, allowing the articles M to arrive at the discharge mouth 70 having traveled the shortest distance and, consequently, the articles M will not line up upwardly and downwardly and are rather quickly collected in the cluster form.

Again, since the radially outer wall 6a of each of the weighing hoppers 6 is inclined at an angle of inclination $\theta 2$ relative to the inner bottom surface 71a of the upper stage chute portion 71, which angle is so chosen as to be small, even the fragile articles M such as, for example, potato chips, of a kind susceptible to damage can be supplied smoothly from the weighing hoppers 6 onto the upper stage chute portion 71 without being damaged. Also, since each of the second gates 62 fitted to the respective discharge mouths 61 of the weighing hoppers 6 is pivotable about the horizontally extending support shaft 63 positioned radially inwardly of the corresponding weighing hopper 6, even when the angle of inclination $\theta 2$ is so chosen as to be small as described above, the respective second gate 62 can be opened large without a space needed between the respective weighing hopper 6 and the upper stage chute portion 71 for selective opening and closing the second gate 62 and while both are positioned close to each other.

In other words, since even when both are arranged close to each other as shown in FIG. 1, the second gate 62 is opened about the support shaft 63 extending radially inwardly of each of the weighing hoppers 6 in a direction away from the inner bottom surface 71a of the upper stage chute portion 71, the second gate 62 can be opened large to assume a vertically upright position as shown by the phantom line in this figure without being disturbed by the inner bottom surface 71a. Accordingly, the articles M can be supplied from the weighing hoppers 6 onto the upper stage chute portion 71 in a collected fashion.

Also, by positioning the weighing hoppers 6 and the upper stage chute portion 71 at respective locations close to each other, the distance over which the articles M are supplied between them can be minimized and the speed at which the articles M collide on the upper stage chute portion 71 can therefore be minimized. Accordingly, the articles M from the weighing hoppers 6 can be supplied onto the upper stage chute portion 71 without being damaged and any possible dispersion of the articles M in the circumferential direction above the upper stage chute portion 71 can be suppressed to allow the individual articles M to be quickly supplied towards the discharge mouth 70 in the cluster form.

The articles M collected at the discharge mouth 70 are immediately supplied through the discharge chute 11 onto the packaging machine 12 positioned therebelow.

Accordingly, the timing at which the hoppers are opened for the subsequent combination weighing cycle and the timing at which the bag is sealed by the packaging machine 12 tend to be delayed. This frustrates speeding up of the weighing and counting operation and the packaging operation.

Figure 3:
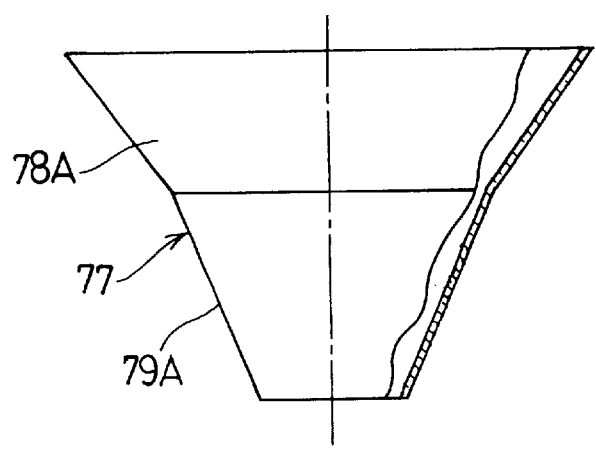
FIG. 3 illustrates a modified form of a lower stage chute portion of the combination weighing and counting apparatus of FIG. 1.

It is to be noted that as shown in FIG. 3 the lower stage chute portion 77 may be an integral structure having a plurality of rectilinearly inclined inner wall surfaces extending vertically. In such case, if a plurality of conical bodies 78A and 79A are arranged up and down and are then welded with each other, the manufacture can be facilitated. Also, instead of the lower stage chute portion 77 being a conical body having a round transverse section, it may be a plurality of conical bodies having a transverse section which is of a polygonal shape.

In the next place, in a second embodiment of the present invention shown in FIG. 4, each of the weighing hoppers 6 is integrally formed with a first partitioning portion 66 so as to extend downwardly below a closed position for the corresponding second gate 62 shown by the solid line. This first partitioning portion 66 is of a generally U-shaped configuration including a bottom wall 66a extending from an outer wall of the corresponding weighing hopper 6, and opposite side walls 66b extending from opposite side walls 6b of the corresponding weighing hopper 6 and positioned on respective sides of the bottom wall 66a.

Figure 5:
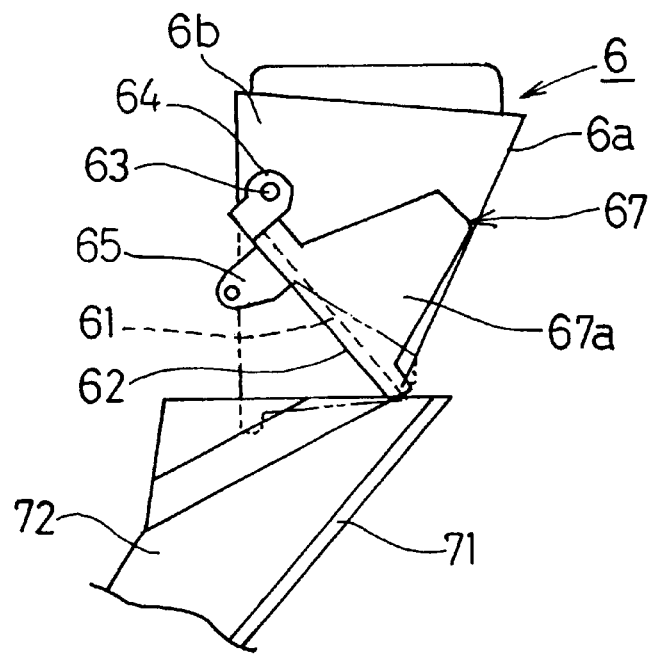
FIG. 5 is similarly a side view, with respective portions of the weighing hopper and the upper stage chute portion cut away, showing a third preferred embodiment of the present invention.

Furthermore, in a third embodiment of the present invention shown in FIG. 5, a second partitioning portion 67 made up of two parallel side plates 67a positioned outwardly of each weighing hopper 6 when the second gate 62 is in the closed position is provided on each side of the second gate 62.

Figure 4:
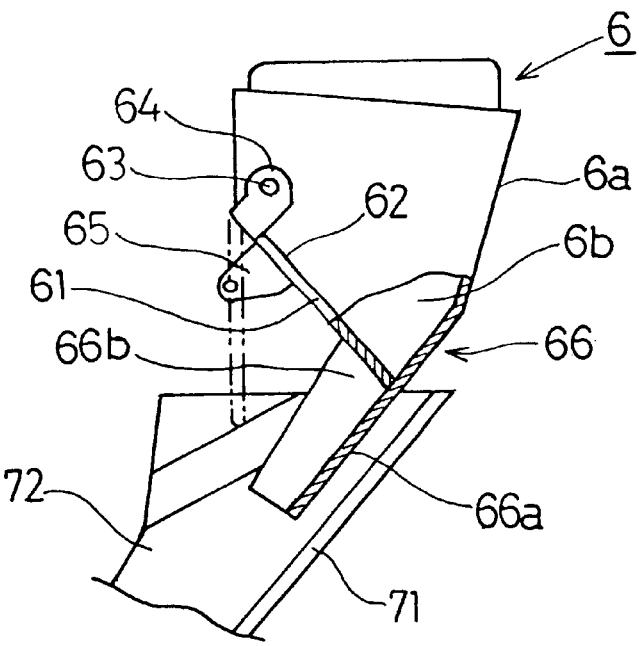
FIG. 4 is a side view, with respective portions of a weighing hopper and the upper stage chute portion cut away, showing a second preferred embodiment of the present invention.

In FIGS. 4 and 5, when the articles M within the weighing hoppers 6 are to be supplied onto the upper stage chute portion 71 with the respective second gates 62 opened as shown by the double-dotted chain line, dispersion of the articles M in the circumferential direction can be suppressed by the first or second partitioning portion 66 or 67. Accordingly, the individual articles M from the weighing hoppers 6 can be immediately supplied to the upper stage chute portion 71 in the cluster form. It is to be noted that the first partitioning portion 66 may be formed with two side plates with no bottom wall 66a as is the case with the second partitioning portion 67.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A combination weighing and counting apparatus which comprises a plurality of hoppers which select a combination of articles supplied into the hoppers by combining respective weights or numbers of the articles within the corresponding hoppers so that the combination of the weights or numbers are discharged form the hoppers within a tolerance range; and a funnel-shaped collecting chute along which the articles fall, including an upper stage chute portion for receiving, between an upper end thereof and a lower end thereof, the articles discharged from the hoppers, and a lower stage chute portion including at least one linear portion and terminating in a discharge mouth at a lower end thereof, wherein the upper stage chute portion has a shape and an angle of inclination, both of which are so designed that the articles discharged from the hoppers and received by the upper stage chute portion can fall in a cluster form along a parabolic line from the lower end of the upper stage chute portion to the discharge mouth by a natural fall.

2. The combination weighing and counting apparatus as claimed in claim 1, further comprising a partitioning member provided in a portion of the upper stage chute portion below the hoppers for preventing the articles, supplied from the hoppers, from dispersing in a direction circumferentially of the collecting chute.

3. The combination weighing and counting apparatus as claimed in claim 2, wherein the partitioning member is formed integrally with the upper stage chute portion.

4. The combination weighing and counting apparatus as claimed in claim 1, wherein the lower stage chute portion has a plurality of inner wall surfaces arranged up and down, each of the inner wall surfaces being rectilinearly inclined at a different angle of inclination, and each of the inner wall surfaces has upper and lower ends in a longitudinal section positioned on the parabolic line, which defines a path for natural fall of the articles, or at respective locations radially outwardly thereof.

5. The combination weighing and counting apparatus as claimed in claim 4, wherein the lower stage chute portion is divided into a plurality of upper and lower divided segments, each of the divided segments being formed of a plate member forming a part of a cone.

6. The combination weighing and counting apparatus as claimed in claim 1, wherein a radially outer wall of each of the hoppers is inclined at a small angle of inclination relative to an inner bottom surface of the upper stage chute portion, and further comprising a gate for controlling supply of the articles within the respective hopper, said gate being pivotally fitted to and about a horizontally extending support shaft positioned radially inwardly of the respective hopper.

7. The combination weighing and counting apparatus as claimed in claim 1, wherein each of the hoppers is provided with a gate for controlling supply of the articles within the respective hopper, and further comprising a first partitioning portion for preventing the articles from dispersing in the circumferential direction when the gate is opened, which first partitioning portion is provided below a closed position of the gate so as to extend from opposite side walls of the respective hopper.

8. The combination weighing and counting apparatus as claimed in claim 1, wherein each of the hoppers is provided with a gate for controlling supply of the articles within the respective hopper, and further comprising a second partitioning portion provided in the gate for preventing the articles from dispersing in the circumferential direction.

9. A combination weighing and counting apparatus which comprises a plurality of hoppers and is operable to select a combination of articles supplied into the hoppers by combining respective weights or numbers of the articles within the corresponding hoppers so that the combination of the weights or numbers may fall within a tolerance range, wherein an upper stage chute portion of a collecting chute for collecting the articles supplied from the hoppers and discharging them from a discharge mouth at a lower end thereof has a shape and an angle of inclination, both of which are so designed that the articles supplied from the hoppers can be discharged in a cluster form and reach the discharge mouth while the discharged articles depict a parabolic line by a natural fall, and wherein a radially outer wall of each of the hoppers is inclined at a small angle of inclination relative to an inner bottom surface of the upper stage chute portion, and further comprising a gate for controlling supply of the articles within the respective hopper, said gate being pivotally fitted to and about a horizontally extending support shaft positioned radially inwardly of the respective hopper.

10. A combination weighing and counting apparatus which comprises a plurality of hoppers and is operable to select a combination of articles supplied into the hoppers by combining respective weights or numbers of the articles within the corresponding hoppers so that the combination of the weights or numbers may fall within a tolerance range, wherein an upper stage chute portion of a collecting chute for collecting the articles supplied from the hoppers and discharging them from a discharge mouth at a lower end thereof has a shape and an angle of inclination, both of which are so designed that the articles supplied from the hoppers can be discharged in a cluster form and reach the discharge mouth while the discharged articles depict a parabolic line by a natural fall, and wherein each of the hoppers is provided with a gate for controlling supply of the articles within the respective hopper, and further comprising a second partitioning portion provided in the gate for preventing the articles from dispersing in the circumferential direction.

11. A combination weighing and counting apparatus which comprises a plurality of hoppers which select a combination of articles supplied into the hoppers by combining respective weights or numbers of the articles within the corresponding hoppers so that the combination of the weights or numbers are discharged form the hoppers within a tolerance range; and a funnel-shaped collecting chute along which the articles fall, including an upper stage chute portion for receiving, between an upper end thereof and a lower end thereof, the articles discharged from the hoppers, and a lower stage chute portion terminating in a discharge mouth at a lower end thereof, wherein the upper stage chute portion is linear and is inclined at an angle in a range of 48–53° relative to a horizontal plane, so that the articles discharged from the hoppers and received by the upper stage chute portion can fall in a cluster form along a parabolic line from the lower end of the upper stage chute portion to the discharge mouth by a natural fall, without substantially contacting the lower stage chute portion.

* * * * *